United States Patent [19]

Heino et al.

[11] 4,208,929

[45] Jun. 24, 1980

[54] AUTOMATIC ELECTRONIC CONTROL FOR A POWER SHIFT TRANSMISSION

[75] Inventors: Dean L. Heino, Cedar Falls; Wayne E. Gruben, Dubuque, both of Iowa

[73] Assignee: Deere & Company, Moline, Ill.

[21] Appl. No.: 752,747

[22] Filed: Dec. 21, 1976

[51] Int. Cl.$^2$ .............................................. B60K 41/22
[52] U.S. Cl. ........................................ 74/731; 74/866
[58] Field of Search .................... 74/866, 645, 731; 192/3.3

[56] References Cited

U.S. PATENT DOCUMENTS

| | | | |
|---|---|---|---|
| 3,448,640 | 6/1969 | Nelson | 74/866 |
| 3,805,640 | 4/1974 | Schneider et al. | 74/645 |
| 3,876,028 | 4/1975 | Asano et al. | 74/866 |

*Primary Examiner*—Rodney H. Bonck

[57] ABSTRACT

An electronically controlled transmission system includes an engine driven torque converter driving a planetary gear transmission. The torque converter is lockable by a lockup solenoid valve to provide a direct through drive and the planetary gear transmission is shiftable among a plurality of gear ratios by selected operation of solenoid operated valves which control power to clutch- and brake-selected transmission gears. An automatic electronic control provides for a "work" mode of transmission operation wherein a shift control provides for manual shifting over a first set of selected gear ratios and for automatic, speed dependent shifting over a second set of selected gear ratios while torque converter lockup inhibition is provided for both sets of ratios. The automatic electronic control further provides for a "transport" mode of transmission operation wherein the shift control provides for manual shifting over a third set of selected gear ratios and for automatic, speed dependent shifting over a fourth set of selected ratios while automatic torque converter lockup is provided for the upper speeds of each of the gear ratios in the third and fourth sets of ratios. The automatic electronic control still further incorporates hysteresis and time delay automatic shifting to prevent speed related hunting for the proper gear ratios as well as the downshift control to prevent manual downshifting at excessive speeds. A manual override and a hold for holding any automatically selected gear ratio is provided for greater operator control.

15 Claims, 3 Drawing Figures

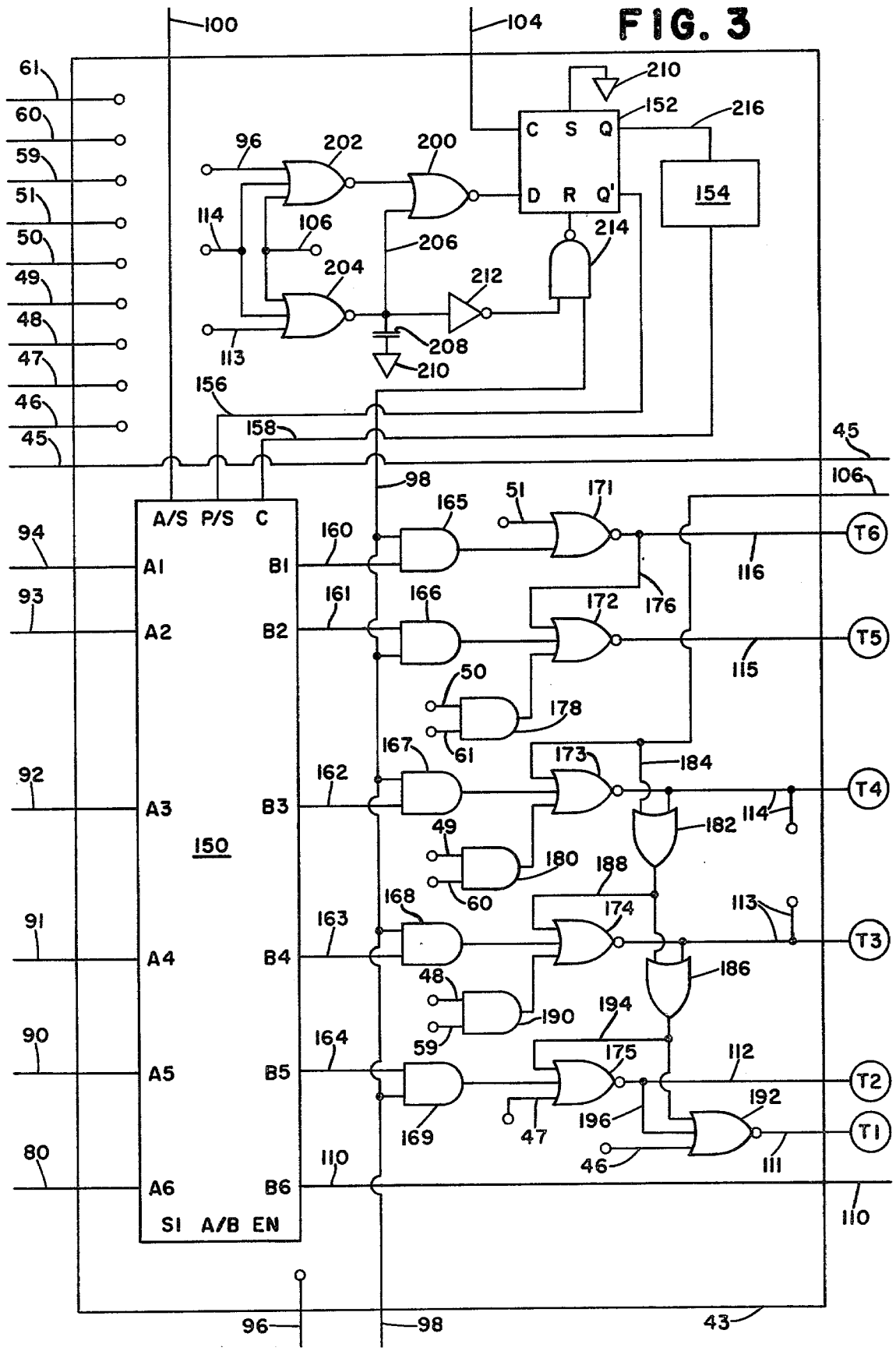

4,208,929

AUTOMATIC ELECTRONIC CONTROL FOR A POWER SHIFT TRANSMISSION

BACKGROUND OF THE INVENTION

The present invention relates generally to electronically controlled transmission for industrial vehicles and more particularly to an electronically controlled transmission which is operable in two different modes of operation to provide the characteristics of two different transmissions in one transmission.

In the past, industrial vehicles were provided with a transmission having a single operating mode which was a compromise between the transmission conditions required for work situations when the vehicle was being used as designed and for transport situations where the vehicle was being driven from work site to work site.

Generally, in industrial vehicles such as scrapers, a large number of transmission gear ratios at slow speeds are desirable for performing the precision off-highway work functions with torque converter operation available to smooth out transmission shocks due to abrupt loading and unloading of the engine. When the vehicle is driven on-highway for transport between work sites, it is desirable to increase engine efficiency by locking up the energy wasting torque converter and by providing a smaller number of gear ratios to reach highway speeds.

Further, in the past, while either manual or automatic transmissions were available, none provided a hybrid system where some of the transmission ratios were obtained manually while others were obtained automatically, and neither did the systems provide for full manual control as well as manual holding of any automatically selected ratio.

SUMMARY OF THE INVENTION

The present invention provides an electronically controlled, hybrid manual/automatic power shifting transmission in which an automatic electronic control selectively provides two distinct modes of transmission operation; a first mode for work situations and a second mode for transport situations.

The above and additional advantages of the present invention will become apparent to those skilled in the art from a reading of the following detailed description when taken in conjunction with the accompanying drawings.

BRIEF DESCRIPTION OF THE DRAWINGS

FIG. 3 is a schematic electrical diagram of one of the block elements of FIG. 2.

DESCRIPTION OF THE PREFERRED EMBODIMENT

Figure 1:
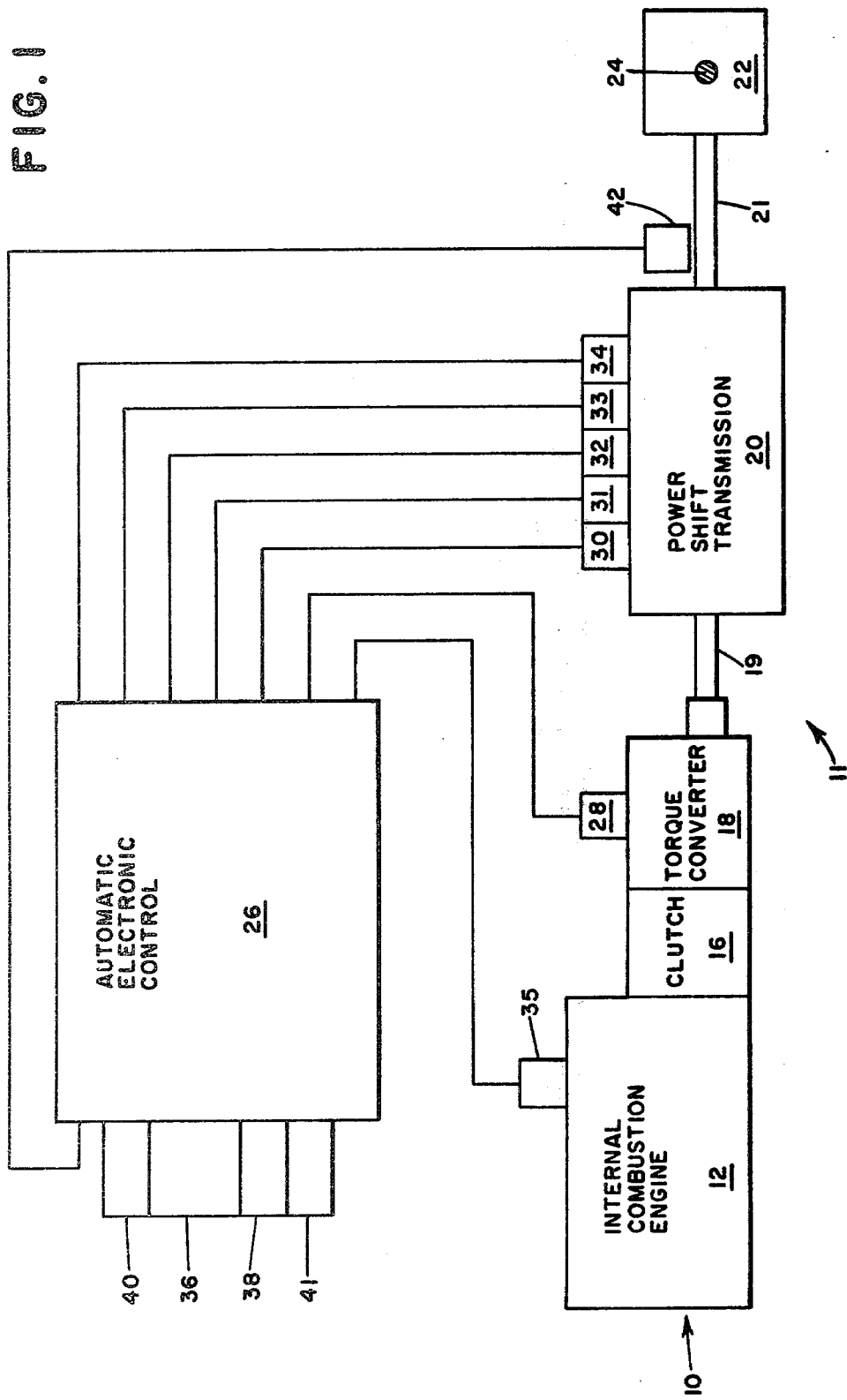
FIG. 1 is a diagrammatic view of a transmission system in accordance with the present invention.

Referring now to FIG. 1, therein is shown a vehicle drive system 10. The drive system 10 includes an internal combustion engine 12 driving a transmission system 11 which includes a clutch 16 for selectively connecting the engine 12 to drive a conventional torque converter 18. The torque converter 18 provides a drive input through a shaft 19 into a conventional power shift mechanical transmission 20. The power shift transmission 20 in the preferred embodiment has a plurality of selectable gear ratios to provide six forward and one reverse speed outputs through a drive shaft 21 to a conventional gear-type differential 22 which drives a vehicle wheel axle 24.

The torque converter 18 and transmission 20 are controlled by an automatic electronic control generally designated by the numeral 26 which provides control signals to lockup solenoid valve circuitry 28 on the torque converter 18 and to conventional hydraulic solenoid valve circuitries numbered consecutively 30 through 34 for selectively supplying pressurized fluid for activating various brakes and clutches in the transmission 20 to change the gear ratio therein. The automatic electronic control 26 further provides a control signal to a starter circuit and motor 35 to allow start-up of the engine 12.

The electronic control 26 is provided with inputs from a shift control 36, a mode control 38, a hold shift control 40, a manual/automatic operation control 41, and a conventional transmission ouput speed sensor 42 which is operatively associated with the drive shaft 21.

Figure 2:
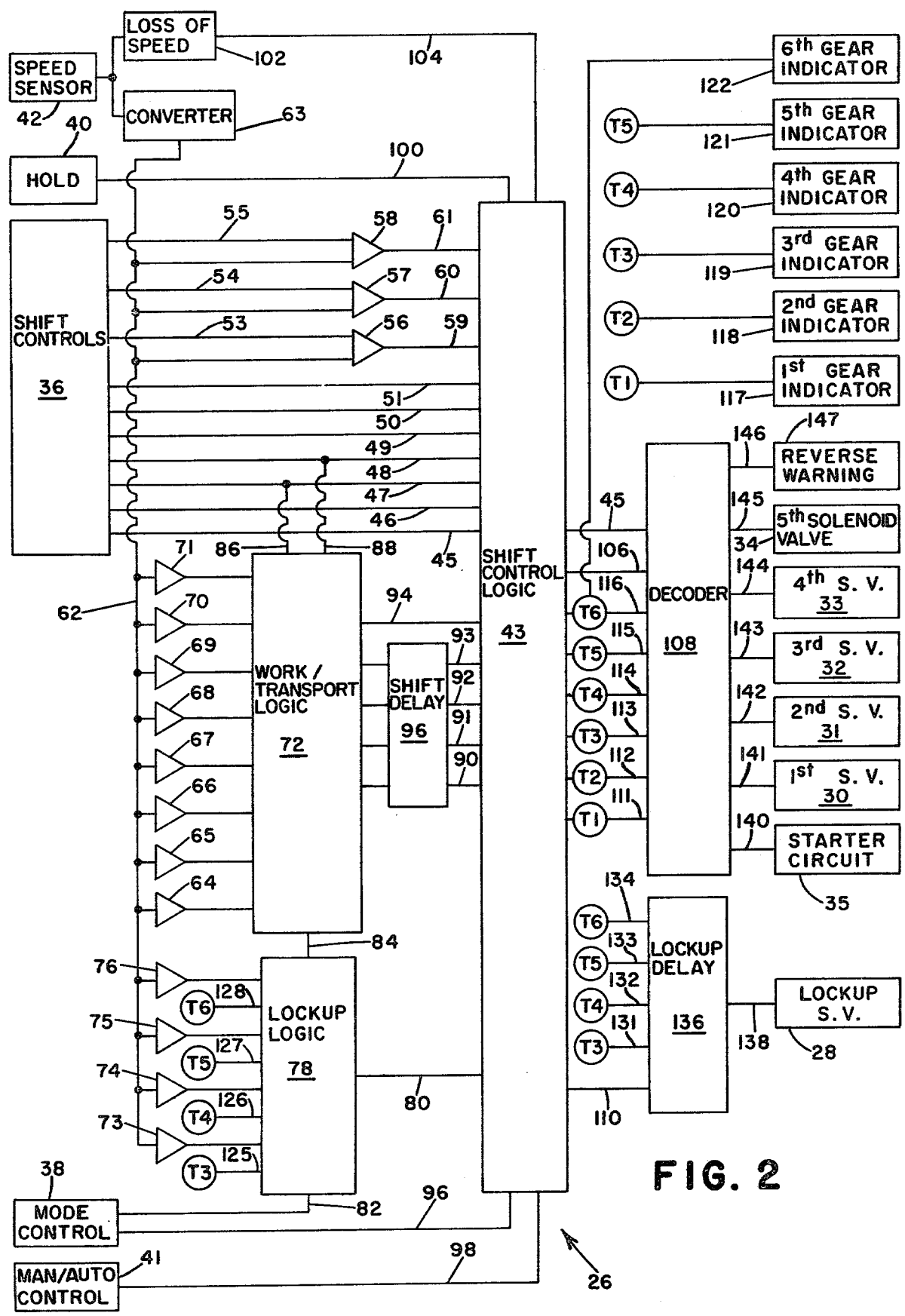
FIG. 2 is a schematic block diagram of a portion of the present invention.

Referring now to FIG. 2, therein is shown the automatic electronic control 26 with the control inputs shown on the left and the controlled outputs shown on the right. The expressions "right" and "left" are used strictly for reference and it will be realized that such expressions are used solely for purposes of convenience and not by way of limitation. Similarly, the power source is not shown since connections thereto would be obvious to those skilled in the art.

The shift controls 36 are connected by seven leads to shift control logic circuitry 43 and these leads, which are the reverse and first through sixth gear leads, are numbered consecutively from 45 to 51. The shift controls 36 are connected by third, fourth, and fifth gear indicating leads 53, 54, and 55 to the first inputs of overspeed comparators 56, 57 and 58, respectively, the outputs of which are connected to the shift control logic circuitry 43 by over-speed leads 59, 60, and 61, respectively. The second inputs of the over-speed comparators 56–58 are commonly connected to a speed signal line 62.

The speed signal line 62 is the output line of a conventional frequency to voltage converter 63 which receives an AC signal from the speed sensor 42 and converts the speed proportional AC frequency signal to a DC speed signal proportional to transmission output speed for the speed signal line 62.

The speed signal line 62 is further connected to the first inputs of a series of speed comparators numbered consecutively from 64 through 71. The speed comparators 64 through 71 each have a predetermined input to their second inputs in accordance with the desired speed switching points as would be evident to those skilled in the art. The outputs of the speed comparators 64 through 71 are connected to work/transport logic circuitry 72.

The speed signal line 62 is further commonly connected to the first inputs of a series of speed comparators numbered consecutively from 73 through 76. The speed comparators 73 through 76 have second inputs providing the signals at which the speed comparators are to switch at the various desired speeds as would be obvious to those skilled in the art. The output of the comparators 73 through 76 are connected to torque converter lockup logic circuitry 78.

The torque converter lockup logic circuitry 78 is connected by a lockup lead 80 to the shift logic control 43, by a mode lead 82 to the mode control 38, and by a logic lead 84 to the work/transport logic circuitry 72.

The work/transport logic circuitry 72 is further connected by first and second leads 86 and 88 to the second and third gear signal leads 47 and 48. The work/transport logic circuitry 72 is further connected by second through sixth gear shift command leads numbered consecutively from 90 through 94 to the shift control logic circuitry 43. Disposed in the second through fifth gear shift command signal leads 90 through 93 are conventional shift delay circuitries generally designated by 97.

The shift control logic circuitry 43 is provided with inputs from the mode control 38 through a mode lead 97, the manual/automatic control 41 through a manual/automatic lead 98, the hold control 40 through a hold lead 100, and the speed sensor 42 through a loss of speed detection circuitry 102 and a loss lead 104. A further feedback signal is received through a feedback line 106 from decoder circuitry 108 as will later be explained.

The inputs of the shift control logic circuitry 43 are through a lockup signal lead 110 and through first through sixth gear state signal leads numbered consecutively 111 through 116 which are all connected to the decoder circuitry 108. Interposed in the gear state signal leads 111 through 116 are terminals consecutively designated by T1 through T6 to which a number of other connections are made as hereinafter described.

To provide an indication of the gear state signals, first through sixth gear indicator circuitries numbered consecutively from 117 through 122 are connected to the terminals T1 through T6, respectively. To provide gear state information to the torque converter lockup logic circuitry 78, the terminals T3 through T6 are connected by consecutively numbered leads 125 through 128 to the torque converter lockup logic circuitry 78. The same signals from the terminals T3 through T6 are supplied through leads numbered consecutively 131 through 134 to lockup delay circuitry 136. The lockup delay circuitry 136 is connected by a lead 138 to the torque converter lockup solenoid valve circuitry 28.

the decoder circuitry 108 is connected by a lead 140 to the starter circuit and motor 35. The decoder circuitry 108 provides the proper combination of solenoid signals to provide the desired gear states through solenoid leads numbered consecutively 141 through 145 to the solenoid valve circuits numbered 30 through 34, respectively. A reverse signal lead 146 provides a signal to a reverse warning indicator 147, which may be a horn, when the proper solenoid valves for reverse operation are activated.

While the shift controls 36, work/transport logic circuitry 72, lockup logic circuitry 78, loss of speed detection circuit 102, the decoder circuitry 108, and the lockup delay circuitry 136 contain conventional logic components and wiring as would be obvious to those having ordinary skill in the art frm a description of their operation, this is not the case with regard to the shift control logic circuitry 43.

Referring now to FIG. 3, a commercially available universal bus register 150, a commercially available flip-flop 152, a conventional oscillator circuit 154, and various logic components, hereinafter to be described, are shown which make up the shift control logic circuitry 43.

The universal bus register 150 has consecutive inputs A1 through A6 to which shft command leads 94 through 90, in inverse order, and lockup command lead 80 are connected. At the top of the universal bus register 150 are an asynchronous/synchronous input designated by A/S to which the hold lead 100 is connected, a parallel/series input designated by P/S which is connected by a P/S lead 156 to the Q' output of the flip-flop 152, and a clock input designated by C connected by a lead 158 to the oscillator circuit 154. The right hand side of the universal bus register 150 has outputs B1 through B6 to which leads 160 through 164, consecutively, and the lockup signal lead 110 are connected, respectively. The serial input designated by SI, and A/B input, and the enable input designated by EN at the bottom of the universal bus register 150 are connected to a voltage source as would be obvious to those skilled in the art.

The leads 160 through 164 are respectively connected to first inputs of conventional AND gates 165 through 169. The second inputs of the AND gates 165 through 169 are all commonly connected to the manual/automatic lead 98 and the outputs are connected respectively to the first inputs of conventional NOR gates 171 through 175.

A second input to the NOR gate 171 is connected to the sixth gear lead 51 which is shown as entering the shift logic control circuit 43 at the upper left hand corner. The output of the NOR gate 171 is connected to the sixth gear state lead 116. The output of the NOR gate 171 is also connected by a lead 176 to a second input of the NOR gate 172. A third input of the NOR gate 172 is connected to the output of an AND gate 178 which is supplied with inputs from the fifth gear lead 50 and the over-speed lead 61. The output of the NOR gate 172 is connected to the fifth gear state lead 115. A second input of the NOR gate 173 is connected to the feedback line 106 and a third input is connected to the output of an AND gate 180 which has inputs from fourth gear lead 49 and the over-speed lead 60. The output of the NOR gate 173 is connected to the fourth gear state lead 114 and to a first input of conventional OR gate 182. A second input of the OR gate 182 is connected by a lead 184 to the feedback lead 106 and the output of the OR gate 182 is connected to a first input of an OR gate 186 and to a second input of the NOR gate 174 by a lead 188. A third input of the NOR gate 174 is connected to the output of an AND gate 190 which is provided with inputs from the third gear lead 48 and the over-speed lead 59. The output of the NOR gate 174 is connected to the third gear state lead 113. A second input of the OR gate 186 is connected to the third gear state lead 113 and the output of the OR gate 186 is connected to a first input of a NOR gate 192 and by a lead 194 to a second input of the NOR gate 175. A third input of the NOR gate 175 is connected to the second gear lead 47. The output of the NOR gate 175 is connected to the second gear state lead 112 and by a lead 196 to a second input of the NOR gate 192. A third input of the NOR gate 192 is connected to the first gear lead 46 and the output of the NOR gate 192 is connected to the first gear state lead 111.

Referring now to the flip-flop 152, it may be seen that the loss lead 104 is connected to the clock input thereof. The data input is connected to the input of a NOR gate 200 which has a first input connected to the output of a NOR gate 202. A first input of the NOR gate 202 is connected to the mode lead 96, a second input is connected to the fourth gear state lead 114, and the third input is connected to the feedback lead 106. The leads 114 and 106 are further connected to the first and second inputs, respectively, of a NOR gate 204 and the third input of the NOR gate 204 is connected to the third gear state lead 113. The output of the NOR gate 204 is connected through a lead 206 to the second input of the NOR gate 200, through a capacitor 208 to ground 210, and through an inverter 212 to a first input of a NAND gate 214. The second input of the NAND gate 214 is connected to the manual/automatic lead 98 and the output of the NAND gate 214 is connected to the reset input designated by R of the flip-flop 152. As previously mentioned, the Q' output is connected to the P/S lead 56. The Q output is connected by a lead 216 to the input of the oscillator circuit 154 and the set input designated by S of the flip-flop 152 is connected to the ground 210.

DESCRIPTION OF OPERATION

An overview of the automatic electronic transmission system operation may be had by reference to FIG. 1. The vehicle operator provides inputs at the shift control 36, the mode control 38, and the manual/automatic control 41 for the automatic electronic control 26. An operator manual override is also available at the hold shift control 40 and a power shift transmission output speed input is provided by the speed sensor 42. The output of the automatic electronic control 26 consists of selected voltage inputs to the starter circuit and motor 35, the lockup solenoid valve circuitry 28, and the solenoid valves circuitries 30-34.

When the operator selects manual transmission control at the manual/automatic control 41 and "work" moade at the mode control 38, the shift logic circuitry 43 is supplied with a digital logic, low voltage (henceforth "lo") through lead 98 and the torque converter lockup logic circuitry 78; and the work/transport logic circuitry 72; and the shift control logic circuitry 43 is supplied with digital logic, high voltages (henceforth "hi's") through leads 82, 84, and 97, respectively. As seen in FIG. 3, the "lo" on the lead 98 from the manual/automatic control 41 is inputted to the AND gates 165-169 which disables inputs from the universal bus register 150 and which provide "lo's" to the NOR gates 171-175. In a neutral gear shift position, the shift controls 36 provide "hi's" to the reverse and first through sixth gear leads 45-51 and likewise, since the speed sensor 42 will indicate zero speed, the overspeed comparators 56-58 will provide "hi's" into the shift control logic circuitry 43.

In the shift control logic circuitry 43, as would be evident to those skilled in the art, a first gear ratio signal or a "hi" at the first lead 46 into the NOR gate 192 causes a "lo" at the terminal T1, a high at the second gear lead 47 into the NOR gate 175 causes a low at the terminal T2, "hi's" at both the third gear lead 48 and the over-speed lead 59 into the AND gate 190 cause a "hi" into the NOR gate 174 and thus a "lo" at the terminal T3, "hi's" at both the fourth gear lead 49 and the over-speed lead 60 into the AND gate 180 cause a "hi" into the NOR gate 173 and thus a "lo" at the terminal T4, "hi's" at both the fifth gear lead 50 and the over-speed lead 61 into the AND gate 178 cause a "hi" into the NOR gate 172 and thus a "lo" at the terminal T5, and a "hi" at the sixth gear lead 51 into the NOR gate 171 causes a "lo" at the terminal T6.

To assure that only one of the terminals T1 through T6 may be "hi" at any one time, a "hi" at the terminal T6 is fed back through the lead 176 to cause the NOR gate 172 and the terminal T5 to go "lo". The "hi" at terminal T6 is further fed back as a "hi" to the inputs of the OR gate 182 and the AND gate 173 which causes the terminal T4 to go "lo". The "hi" input into the OR gate 182 causes a "hi" input into the OR gate 186 and into the NOR gate 174 so as to cause the terminal T3 to go "lo". The "hi" input into the OR gate 186 causes it to go "hi" to provide "hi" inputs into the NOR gate 175 to cause the terminal T2 to go "lo" and into the NOR gate 192 to cause the terminal T1 to go "lo".

A "hi" at the terminal T5 is fed back through the feedback lead 106 to cause "lo's" at terminals T1 throuh T4 as previously described for when a "hi" appears on feedback lead 106. Since a "hi" on terminal T5 will automatically cause "lo's" at terminals T1 through T4, and since a "hi" at terminal T6 will cause to "lo" at T5, it will be apparent that only one of the terminals may be "hi" at a time.

A "hi" at the terminal T4 will cause a "hi" to be inputted into the OR gate 182 so as to cause a "hi" therefrom which will cause "lo's" at terminals T1 through T3. Similarly, a "hi" at the terminal T3 will cause a "hi" into the OR gate 186 to cause lo's at terminals T1 and T2, and a "hi" at the terminal T2 will cause a "hi" to be inputted to the NOR gate 192 to cause a "lo" at the terminal T1.

The "lo's" at the terminals T1-T6 and on the reverse lead 45, occurring in neutral, are processed by the decoder circuitry 108 which then provides a "hi" only to the starter lead 140 to allow the starter circuit and motor 35 to operate to crank the engine 12 for starting once power is applied to the system.

When the operator shifts to reverse gear, a "hi" is imposed on the reverse lead 45 which is decoded by the decoder circuitry 108 to cause the starter lead 140 to go "lo" and the solenoid leads 141, 142, and 143 to go "hi" so as to cause the transmission to go into reverse, and to provide a "hi" on lead 146 to cause a reverse warning from the reverse warning circuitry 147.

When the operator shifts into first gear, the shift controls 36 impose a "lo" on the first gear lead 46 as well as "lo's" on the overspeed leads 53-55. The "lo" on the first gear lead 46 causes the NOR gate 192 to provide a "hi" at the terminal T1. The "hi" at the terminal T1 causes the decoder circuitry 108 to provide "hi's" through the solenoid leads 142, 143, and 144 to activate the second, third, and fourth solenoid valve circuitries 31-33 respectively. With the terminal T1 "hi", an indication is also provided by the first gear indicator 117.

When the operator shifts into second gear, the shift controls 36 impose an additional "lo" on the second gear lead 47 in addition to those "lo's" mentioned for the first gear. The "lo" on the second gear lead causes the output of the NOR gate 175 to go "hi" and provide a "hi" at the terminal T2 while causing the NOR gate 192 to go "lo". The decoder circuitry 108 causes the solenoid leads 142 and 143 to go "hi" to activate the second and third solenoid valve circuitries 31 and 32 so as to cause the transmission to shift from first to second gear. The "hi" on the terminal T2 further causes an indication at the second gear indicator 118.

When the operator shifts into third gear, the shift controls 36 impose a "lo" on the third gear lead 48 in addition to the previously mentioned "lo's" due to the first and second gears. The "lo" on the third gear lead 48 will cause the AND gate 190 to go "lo". The output of the overspeed comparator 56 will be "hi" as long as the transmission output speed is under a first predetermined overspeed value. A "lo" output from the AND gate 190 combined with "lo" inputs on the other two inputs causes the NOR gate 174 to go "hi" and impose a "hi" on the terminal T3. The high at the terminal T3 causes an indication from the third gear indicator 119. The "hi" at the terminal T3 causes the decoder circuitry 108 to provide "hi's" to the third and fourth solenoid valve circuitries 32 and 33 to cause the transmission to shift from second to third gear.

When the operator shifts into fourth gear, the shift controls 36 impose a "lo" on the fourth gear lead 49 in additon to the "lo's" due to the first through third gears. The "lo" on lead 49 will cause a "lo" out of the AND gate 180 as long as there is a "lo" from the overspeed comparator 57. The overspeed comparator 57 will remain "hi" as long as the transmission output speed is below a second predetermined over speed value. The "lo" out of the AND gate 180 causes a "hi" out of the NAND gate 173 which provides a "hi" at terminal T4. This causes an indication from the fourth gear indicator 120 and the decoder circuitry 108 to provide "hi's" to the third solenoid valve circuitry 32 to shift the transmission into the fourth gear ratio.

When the operator shifts into fifth gear, the shift controls 36 impose a "lo" on the fifth gear lead 50 which will cause the AND gate 178 to provide a "lo" output. The overspeed comparator 58 will provide a "hi" as long as the transmission output speed is below a third predetermined overspeed value. The "lo" from the AND gate 178 causes the output of the NAND gate 172 to go "hi" and provides a "hi" at the terminal T5. The decoder circuitry 108 processes the "hi" at terminal T5 to provide a feedback signal along the lead 106 to disable the lower gear states and provide "lo's" at terminals T1-T4. A "hi" at the terminal T5 causes an indication from the fifth gear indicator 121 and causes the decoder circuitry 108 to provide "hi's" to second through fifth solenoid valve circuitries 30-34 to cause the transmission to shift into fifth gear.

When the operator shifts into sixth gear, the shift controls 36 will impose a "lo" on the sixth gear lead 51 in addition to the "lo's" imposed for the first through fifth gears. The "lo" on the sixth gear lead 51 will cause the NOR gate 171 to provide a "hi" to cause the terminal T6 to go "hi". The "hi" at the terminal T6 will cause an indication at the sixth gear indicator 122 as well as provide "hi's" to the third through fifth solenoid valve circuitries 32-34 to cause the transmission to shift into the sixth gear.

During the previously described shifting, the mode control 38 in the work mode provides a "hi" to the torque converter lockup logic circuitry 78 which imposes a "lo" on the lockup lead 80. The "lo" on the lockup lead 80 enters the A6 input of the universal bus register 150 and exits through output B6 to lead 110 which imposes a "lo" on the lockup delay circuitry 136, the output of which is held to "lo" so as to prevent activation of the torque converter lockup solenoid circuitry 28.

As the operator downshifts in manual from sixth to neutral, the operation will be exactly the reverse from that described above. It should be noted in addition, that if the transmission output speed is greater than the first, second, or third predetermined overspeed values during the third, fourth, or fifth gear operations, respectively, the transmission will not downshift. This feature provides damage protection for the transmission by preventing downshifting, even with manual shifting, at excessive speeds and further allows the operator to brake the vehicle with the transmission except when a downshift will overspeed the engine.

When the operator selects automatic transmission control at the manual/automatic control 41 while keeping the mode control 38 on the "work" mode, the shift control logic 43 is provided with a "hi" on the lead 98 which provides "hi's" to the inputs of the AND gates 165-169, and to the NAND gate 214. The "hi" from the mode control 38 carried by the lead 96 causes the output of the NOR gate 202 to go "lo" and the output of the NOR gate 200 to also go "lo" since the other input thereto is a "hi" from the NOR gate 204 which has all "lo" inputs. The "lo" input from the NOR gate 200 to the data input of the flip-flop 152 results in a low from the Q' output into the parallel series input of the universal bus register 150. This results in any signal to the A1 through A6 inputs to be outputted from the B1 through B6 outputs, respectively. As evident, the "hi" from the mode switch 38 into the lockup logic converter 78 is outputted as a "lo" through lockup lead 80 to the shift control logic circuitry 43 where it is inputted into the A6 input and outputted as a "lo" out of the B6 output and then processed by the lockup delay circuitry 136 where it inhibits any "hi" signals from being sent to the torque converter lockup solenoid circuitry 28.

When the operator shifts between reverse, neutral, and first gear in the work mode, the automatic electronic control 26 functions in the same manner as under manual control. While the mode control 38 in the work mode acting through the torque converter lockup logic circuitry 78 on the work/transport logic circuitry 72 enables the speed comparators 64-66, 68 and 70 to operate, they will have no effect in the aforementioned three gear positions.

When the operator shifts into second gear with the transmission output above a first predetermined upshift speed, the speed comparator 64 will provide a "hi" to the work/transport logic circuitry 72 which will be processed with the "lo" on the first lead 86 to provide a "lo" to the shift delay circuitry 96. In the shift delay circuitry 96, the introduction of the "lo" to the shift control logic circuitry 43 will be delayed a predetermined amount of time to prevent hunting during the automatic shifting from first to second gear. The "lo" on the second gear shift lead 90 is inputted to the A5 input of the universal bus register 150 and outputted to the AND gate 169 from the output B5. When the "lo" is inputted into the AND gate 169, a "lo" will be outputted to the NOR gate 175 which provides a "hi" to the terminal T2 to cause the transmission to be shifted into second gear.

If the transmission output speed drops below a first predetermined downshift speed, the speed comparator 64 will provide a "lo" to the work/transport logic circuitry 72 which in conjunction with the shift control logic circuitry 43 will cause the the terminal T2 to go "lo" and the terminal T1 to go "hi" to automatically downshift from second to first gear. The difference between th upshift and downshift predetermined speeds is due to a speed comparator hysteresis which serves to prevent hunting during automatic gear shifts.

When the operator shifts into third gear with the transmission output above a second predetermined upshift speed, the speed comparator 65 will provide a "hi" to the work/transport logic circuitry 72 which will be processed with the "lo" on the second lead 88 to provide a "lo" which will be delayed by the shift delay circuitry 96 and then processed by the shift control logic 43 to provide a "hi" at the terminal T3. Operation of the logic in the shift control logic circuitry 43 is similar to that for second gear. If the speed drops below a second predetermined downshift speed, the speed comparator 65 will provide a "lo" which in a manner similar to that described for the automatic downshift for second gear will be processed to provide a "lo" at terminal T3 and a "hi" at terminal T2 to automatically downshift from third to second gear.

When the operator shifts into fourth gear with the transmission output above a third predetermined upshift speed, the speed comparator 66 will provide a "hi" to the work/transport logic circuitry 72 which will provide a "lo" for delay by the shift delay circuitry 96 and processing by the shift logic control circuitry 43 to provide a "hi" at the terminal T4 and cause an upshift at the transmission from third to fourth gear. If the transmission speed drops below a third predetermined downshift speed, the speed comparator 66 will provide a "lo" which will cause the terminal T4 to go "lo" and T3 to go "hi" to cause a downshift from fourth to third gear.

When the operator shifts into fifth gear with the transmission output speed above a fourth predetermined upshift speed, the speed comparator 68 will provide a "hi" to the work/transport logic circuitry 72 which will provide a "lo" to be delayed by the shift delay circuitry 96 and processed by the shift control logic circuitry 43 to provide a "hi" at the terminal T5 and cause a shift from fourth to fifth gears. If the transmission output speed drops below a fourth predetermined downshift speed, the speed comparator 68 will provide a "lo" to the work/transport logic circuitry 72 which will cause a "lo" at the terminal T5 and a "hi" at the terminal T4 to automatically downshift from fifth gear to fourth gear.

When the operator shifts into sixth gear with the transmission output speed above a fifth predetermined upshift speed, the speed comparator 70 will provide a "hi" to the work/transport logic circuitry 72 which will provide a "lo" to be delayed by the shift delay circuitry 96 and processed by the shift control logic circuitry 43 to provide a "hi" at the terminal T6. If the transmission output speed drops below a fifth predetermined downshift speed, the speed comparator 70 will provide a "lo" to the work/transport logic circuitry 72 which provides a "hi" to be delayed by the shift delay circuitry 96 and processed by the shift control logic circuitry 43 to cause the terminal T6 to go "lo" and the terminal T5 to go "hi" to automatically downshift from sixth to fifth gear.

As evident from the previous description, the shift controls 36 will sequentially turn the "hi's" on leads 47-51 to "lo's" as the desired gear is shifted from second to sixth gear and the transmission output speed will control the transmission gear state between the second gear and the highest selected gear ratio.

For a second mode of transmission operation, the operator selects the "transport" mode of operation. The transport mode signal, which is a "lo", is processed by the torque converter lockup logic circuitry 78 and the work/transport control logic 72 to enable the speed comparators 67, 69, and 71 and to disenable the speed comparators 64-65, 68, and 70.

When the operator shifts between reverse, neutral, first, second, and third gears, in the transport mode, the automatic electronic control 26 functions in the same manner as under manual control. As the transmission output speed exceeds a first predetermined lockup speed, the lockup speed comparator 73 provides a "hi" which, in conjunction with the "hi" at the terminal T3 inputted to the lockup logic circuitry 78, will cause a "hi" to be inputted to the shift control logic circuitry 43 and outputted therefrom to the lockup delay circuitry 136. The lockup delay circuitry 136 will process the "hi" at the terminal T3 and the "hi" from the shift control logic circuitry 43 on lead 110 to delay the signal and then provide a lockup signal as a "hi" to activate the lockup solenoid valve circuitry 28 and provide a direct drive through the torque converter 18 in third gear.

When the operator shifts into fourth gear with the transmission output speed above a sixth predetermined upshift speed which is between the third and fourth predetermined upshift speeds, the speed comparator 67 will provide a "hi" which will cause the work/transport control logic circuitry 72 to provide a "lo" to the shift delay circuitry 96. After a delay in the shift delay circuitry 96, the "lo" will be processed by the shift control logic circuitry 43 to provide a "hi" at the terminal T3 and shift the transmission from third to fourth gear. In the preferred embodiment, the fourth gear torque converter drive is eliminated. This is accomplished by selecting the transmission output speed for torque converter lockup at a second predetermined lockup speed which is less than with sixth predetermined upshift speed. The lockup speed comparator 74 then provides a "hi", which in conjunction with the "hi" at the terminal T4 is inputted to the lockup logic circuitry 78 to cause a "hi" to be inputted to the shift control logic circuitry 43 and outputted therefrom to the lockup delay circuitry 136 and thence to the lockup solenoid valve circuitry 28 to lockup the torque converter 18 and provide direct drive through the entire fourth gear speed range.

When the operator shifts into fifth gear in the transport mode, the automatic electronic control 26 shifts in the same manner as in the work mode except that the speed comparator 69 governs the shifting speeds. As the transmission output speed exceeds a third predetermined lockup speed, the lockup speed comparator 75 provides a "hi" which, in conjunction with the "hi" at the terminal T5 inputted to the torque converter lockup logic circuitry 78, will cause a "hi" to be inputted to the shift logic control circuitry 43 and outputted therefrom to the lockup delay circuitry 136. The lockup delay circuitry 136 will process the "hi" at the terminal T5 and the "hi" from the shift control logic circuitry 43 to delay and then provide a lockup signal as a "hi" to activate the lockup solenoid valve circuitry 28 to lockup the torque converter 18 and provide direct drive in fifth gear.

When the operator shifts into sixth gear, the automatic electronic control 26 shifts in the same manner as in the work mode except that the speed comparator 71 governs the shifting speeds. As the transmission output speed exceeds a fourth predetermined lockup speed, the lockup speed comparator 76 provides a "hi" which in conjunction with the "hi" at the terminal T6 inputted to the lockup circuitry 78, will cause a "hi" to be inputted to the shift control logic circuitry 43 and outputted therefrom to the lockup delay circuitry 136. The lockup delay circuitry 136 will delay the "hi" at the terminal T6 and the "hi" from the shift control logic circuitry 43 to delay and then provide a lockup signal as a "hi" to activate the lockup solenoid valve circuitry 28 to lockup the torque converter 18 and provide direct drive in sixth gear.

From the above, it is evident that in the preferred embodiment the transmission 14 in transport mode will provide, sequentially, a third torque converter drive, a third direct drive, a fourth direct drive, a fifth torque converter drive, a fifth direct drive, a sixth torque converter drive, and a sixth direct drive. As obvious from the description above, the shift control 36 establishes the maximum gear the transmission 14 can be in and the automatic electronic control 26 automatically shifts up to and down from that gear on the basis of transmission output speed. A further input into the automatic electronic control 26 is through the hold control 40 which during normal operation provides a "hi" to the A/S input of the universal bus register 150. When the operator selects "hold", a "lo" input is provided into the A/S input to lock the B1-B6 outputs and maintain the previously inputted transmission state during automatic operation and thus inhibit any shift associated with a change in speed.

Since the automatic control of the transmission 14 is dependent upon the speed signal from the speed sensor 42, the loss of speed signal detection circuitry 102 is provided to downshift the transmission one gear at a time with a predetermined time delay between the shifts to protect against high speeds and torques caused by multiple high speed gear downshifts.

As long as the speed signal is present, a "lo" will be inputted by the lead 104 into the clock input of the flip-flop 152. With the transmission 14 in fourth, fifth, or sixth gear, the "hi's" on the feedback lead 106 and the terminal T4 will cause "lo's" from the NOR gates 202 and 204. The "lo's" into the NOR gate 200 cause a "hi" into the D input of the flip-flop 152. The "lo" into the inverter 212 causes a "hi" which is combined with the automatic operation "hi" on the manual/automatic lead 98 in the NAND gate 214 to provide a "lo" to the R input of the flip-flop 152. As a result of the "lo" C input and "hi" data input, the Q output will be "lo" so as to disenable operation of the oscillator circuit 154 and the Q' output will be "hi" so as to cause "parallel" operation of the universal bus register 150.

If the speed signal fails, a "hi" will be inputted by the lead 104 into the C input of the flip-flop 152. With the D input "hi" Q output will go "hi" to enable the oscillator circuit 154 to provide "hi" pulses to the C input of the universal bus register 150 at predetermined intervals, approximately three seconds in the preferred embodiment, and the Q' output will go "lo" to cause the universal bus register 150 to go into "serial" operation. With each "hi" C input, the universal bus register 150 will sequentially switch the "lo's" at B1 through B4 to "hi's" so as to downshift the transmission 14 from sixth to third gear. In the transport mode, with a downshift out of fourth gear, the "lo" on the lead 96 will cause the D input of the flip-flop 152 to go low and reverse the Q and Q' outputs so as to disenable the oscillator circuit 154 and place the universal bus register 150 back in parallel operation with the transmission 14 in third gear. In the work mode, with a downshift out of third gear, the "lo" on the terminal T3 will cause the D input of the flip-flop 152 to go low and reverse the Q and Q' outputs to place the universal bus register 150 back in operation with the transmission 14 in second gear. With the universal bus register 150 back in parallel operation, the speed comparator 64 will cause a further downshift into first gear due to the loss of the speed signal. With either transport or work mode, when the terminal T3 goes low, the flip-flop 152 will be reset. Thus, once this sequence of downshifts is initiated, it will continue until the third gear is reached in the transport mode or the first gear is reached in work mode even if the speed signal reappears. When the transmission 14 reaches the lowest automatic downshift gear, it is again permitted to shift up as the speed input dictates.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. In a transmission system including a torque converter driven by an engine, torque converter lockup means for locking up the torque converter to provide a direct drive therethrough, a transmission driven by the torque converter and shiftable among a plurality of speed ratios to provide a variable speed transmission output, shifting means operatively associated with the transmission for selectively shifting said transmission among the plurality of speed ratios, speed sensor means responsive to the speed of the transmission output to provide a speed signal proportional thereto, and shift control means for selecting desired transmission speed ratios and providing ratio signals representative thereof, an automatic control comprising: mode select means selectable between first and second transmission system operating modes and respectively providing first and second mode signals representative thereof; and logic means operatively associated with the mode select means, the shift control means, and the speed sensor means to automatically cause the shifting means to shift said transmission within a first range of speed ratios at a first set of pedetermined speed signals and to automatically inhibit the torque converter lockup means from locking up the torque converter when the first mode signal is provided, and to automatically cause the shifting means to shift said transmission within a second range of speed ratios at a second set of predetermined speed signals and to automatically cause the torque converter lockup means to lock up the torque converter at a third set of predetermined speed signals when the second mode signal is provided.

2. The automatic control as claimed in claim 1 wherein the logic means includes detection means to automatically cause the shifting means to shift said transmission to a first predetermined speed ratio when the first mode signal is provided and the speed signal terminates and to a second predetermined speed ratio when the second mode signal is provided and the speed signal terminates.

3. The automatic control as claimed in claim 1 wherein the logic means includes hold means operable for preventing changes in the speed signal from automatically causing the shifting means from shifting said transmission from one speed ratio to another.

4. In a transmission system including a torque converter driven by an engine, torque converter lockup means for locking up the torque converter to provide a direct drive therethrough, a mechanical transmission driven by the torque converter and upshiftable and downshiftable among a plurality of gear ratios to provide a variable speed transmission output, shifting means operatively associated with said transmission for selectively shifting said transmission among the plurality of gear ratios, speed sensor means responsive to the speed of the transmission output to provide a speed signal proportional thereto, and shift control means upshiftable and downshiftable to a desired transmission gear ratio and providing a gear signal representative thereof, an automatic control comprising: mode select means selectable between first and second transmission system operating modes and respectively providing first and second mode signals representative thereof; and logic means operatively associated with the mode select means, the shift control means, and the speed sensor means to automatically cause, within a first range of gear ratios established by the gear signal, the shifting means to upshift and downshift said transmission at a first and second set of predetermined speed signals, respectively, and to automatically inhibit the torque converter lockup means from locking up the torque converter when the first mode signal is provided, and to automatically cause, within a second range of gear ratios established by the gear signal, the shifting means to upshift and downshift said transmission at a third and fourth set of predetermined speed signals, respectively, and to automatically cause the torque converter lockup means to lockup and unlock the torque converter at a fifth and sixth set of predetermined speed signals, respectively, of the shift control means when the second mode signal is provided.

5. In a transmission system including a torque converter driven by an engine, torque converter lockup means including lockup solenoid valve means for locking up the torque converter to provide a direct drive therethrough, a gear-type transmission driven by the torque converter and shiftable among a plurality of gear ratios to provide a variable speed transmission output, shifting means including solenoid operated valve means for shifting said transmission among the plurality of gear ratios, speed sensor means responsive to the transmission output speed to provide a speed signal proportional thereto, and manually operable shift control means for selecting a desired transmission gear ratio and providing gear signals representative thereof, an automatic electronic control comprising: mode select means selectable between first and second transmission system operating modes and respectively providing first and second mode signals representative thereof; mode logic means operatively connected to the speed sensor means and the mode select means responsive to the speed signal to provide shift command signals at first and second sets of predetermined speed signals when the first and second mode signals, respectively, are provided; torque converter logic means operatively connected to the speed sensor means, the shift control means, the torque converter lockup means, and the mode select means responsive to the speed signal to provide lockup signals to operate the lockup solenoid valve means at a third set of predetermined speed signals with a first set of predetermined gear signals when the second mode signal is provided; shift logic means operatively connected to the shift control means, the mode logic means, and the mode select means responsive to the gear signals to provide gear state signals related thereto at a second set of predetermined gear signals and to the shift command signals to provide gear state signals related thereto at a third set of predetermined gear signals when the first mode signal is provided, and responsive to the gear signals to provide gear state signals related thereto at a fourth set of predetermined gear signals and to the shift command signals to provide gear state signals related thereto at a fifth set of predetermined gear signals when the second mode signal is provided; and decoder means operatively connected to the shift logic means and the shifting means for operating the solenoid valve means to shift said transmission to gear ratios related to the gear state signals.

6. The automatic electronic control as claimed in claim 5 including detection means disposed in the operative connection between the speed sensor means and the shift logic means responsive to the termination of the speed signal to cause the shift logic means to shift said transmission to first and second predetermined gear ratios when the first and second mode signals, respectively, are provided.

7. The automatic electronic control as claimed in claim 5 including hold means connected to the shift logic means operable to prevent the shift logic means from changing the gear state signal in response to the gear signal or the shift command signal.

8. In a transmission system including a torque converter driven by an engine, torque converter lockup means including lockup solenoid operated valve means for locking up the torque converter to provide a direct drive therethrough, a gear-type transmission driven by the torque converter and shiftable up and down among a plurality of gear ratios to provide a variable speed transmission output, shifting means including solenoid operated valve means for shifting said transmission among the plurality of gear ratios, speed sensor means responsive to the transmission output speed to provide a speed signal proportional thereto, and manually operable shift control means upshiftable and downshiftable from a desired transmission gear ratio and providing gear ratio signals representative thereof, an automatic electronic control comprising: mode select means selectable between first and second transmission system operating modes and respectively providing first and second mode signals representative thereof; mode logic means operatively connected to the speed sensor means and the mode select means responsive to the speed signal to provide shift command signals at first and second sets pf predetermined speed signals when the first and second mode signals, respectively, are provided; torque converter logic means operatively connected to the mode select means, the shift control means and the speed sensor means responsive to the second mode signal and third and fourth sets of predetermined speed signals at a first set of predetermined gear signals to respectively provide and terminate lockup signals to the lockup solenoid operated valve means to respectively lockup and unlock the torque converter; shift logic means operatively connected to the shift control means, the mode logic means, and the mode select means responsive to the gear ratio signals to provide gear state signals relative thereto at a second set of predetermined gear signals and to the shift command signals to provide gear state signals related thereto at a third set of predetermined gear ratio signals when the first mode signal is provided, and responsive to the gear ratio signals to provide gear state signals related thereto at a fourth set of predetermined gear ratio signals and to the shift command signals to provide gear state signals related thereto at a fifth set of predetermined gear ratio signals when the second mode signal is provided; and decoder means operatively connected to the shift logic means and the shifting means for operating the solenoid valve means to shift said transmission to gear ratios related to the gear state signals.

9. In a transmission system including a torque converter driven by an engine, torque converter lockup means including a lockup solenoid valve for locking up the torque converter to provide a direct drive therethrough, a gear transmission driven by the torque converter and shiftable among first, second, and third gear ratios to provide a variable speed output, shifting means including a plurality of solenoid operated valves for selectively shifting said transmission among the first, second, and third gear ratios, speed sensor means responsive to the speed of said transmission output to provide a speed signal proportional thereto, and manually operable shift control means for selecting the first, second, and third gear ratios and respectively providing first, second, and third gear ratio signals, an automatic electronic control comprising: mode select means selectable between work and transport transmission system operating modes and respectively providing work and transport mode signals representative thereof; mode logic means operatively connected to the speed sensor means, and the mode means including first and second comparators responsive to first and second speed signals to provide first and second shift commands signal when the work mode signal is provided, and including third comparator means responsive to a third speed signal to provide the second shift command signal when the transport mode signal is provided; torque converter logic means operatively connected to the speed sensor means, the shift control means, the torque converter lockup means, and the mode select means including a fourth comparator to provide a lockup signal to operate the lockup solenoid valve in response to a fourth speed signal and the third gear ratio signal when the transport mode signal is provided; shift logic means operatively connected to the shift control means, the mode logic means, and the mode select means responsive to the first gear ratio signal to provide a first gear state signal and to the first and second shift command signal to respectively provide second and third gear state signals when the work mode signal is provided, and responsive to the first and second gear ratio signals to respectively provide the first and second gear state signals and to the second shift command signal to provide the third gear state signal when the transport mode signal is provided; and decoder means operatively connected to the shift logic means and the shifting means for operating said plurality of solenoid operated valves to shift said transmission to the first, second, and third gear ratios in response, respectively, to the first, second, and third gear state signals.

10. The automatic electronic control as claimed in claim 9 including detection means disposed in the operative connection between the speed sensor means and the shift logic means responsive to the termination of the speed signal to cause the shift logic means to provide first and second predetermined gear state signals when the first and second mode signals, respectively, are provided.

11. The automatic electronic control as claimed in claim 9 including hold means connected to the shift logic means operable to prevent the shift logic means from changing the gear state signal in response to the gear signal or the shift command signal.

12. In a transmission system including a torque converter driven by an engine, torque converter lockup means including a lockup solenoid valve for locking up the torque converter to provide a direct drive therethrough, a planetary gear transmission driven by the torque converter and shiftable up and down among first, second, and third gear ratios, shifting means including transmission solenoid operated valves for selectively shifting said transmission among the first, second, and third gear ratios, speed sensor means responsive to the speed of said transmission output to provide speed signals proportional thereto, and manually operable shift control means upshiftable to and downshiftable from the first, second, and third gear ratios and respectively providing first, second, and third gear ratio signals, an automatic electronic control comprising: mode select means selectable between work and transport transmission system operating modes and respectively providing work and transport mode signals representative thereof; mode logic means operatively connected to the speed sensor means and the mode means including a first comparator responsive to first and second speed signals to respectively provide and terminate a first shift command signal and a second comparator responsive to third and fourth speed signals to respectively provide and terminate a second shift command signal when the work mode signal is provided, and including a third comparator responsive to fifth and sixth speed signals to respectively provide and terminate the second shift command signal when the transport mode signal is provided; torque converter logic means operatively connected to the speed sensor means, the shift control means, the torque converter lockup means, and the mode select means including a fourth comparator responsive to seventh and eighth speed signals and the third gear ratio signal to respectively provide and terminate a lockup signal to operate the lockup solenoid valve circuitry when the transport mode signal is provided; shift logic means operatively connected to the shift control means, the mode logic means, and the mode select means responsive to the first gear ratio signal to provide a first gear state signal, and to the first and second shift command signals to respectively provide second and third gear state signals when the work mode signal is provided, and responsive to the first and second gear ratio signals to respectively provide the first and second gear state signals and to the second shift command signal to provide the third gear state signal when the transport mode signal is provided; and decoder means operatively connected to the shift logic means and the shifting means for operating the transmission solenoid operated valves to shift said transmission to the first, second, and third gear ratios in response, respectively, to the first, second, and third gear state signals.

13. An automatic control for a transmission system including a torque converter driven by an engine, torque converter lockup means for locking up the torque converter to provide a direct drive therethrough, a mechanical transmission driven by the torque converter and shiftable among a plurality of speed ratios to provide a variable speed transmission output, shifting means operatively associated with the transmission for selectively shifting said transmission among the plurality of speed ratios, speed sensor means responsive to the speed of the transmission output to provide a speed signal proportional thereto, and shift control means for selecting a desired transmission speed ratio and providing ratio signals representative thereof, comprising: mode select means selectable between first and second transmission system operating modes and respectively providing first and second mode signals representative thereof; and logic means operatively associated with the mode select means, the shift control means, and the speed sensor means to automatically cause the shifting means to shift said transmission within a range of speed ratios established by the ratio signal at a first set of predetermined speed signals and to automatically inhibit the torque converter lockup means from locking up the torque converter when the first mode signal is provided, and to automatically cause the shifting means to shift said transmission within a range of speed ratios established by the ratio signal at a second set of predetermined speed signals and to automatically cause the torque converter lockup means to lock up the torque converter at a third set of predetermined speed signals when the second mode signal is provided.

14. The automatic control as claimed in claim 13 wherein the logic means includes loss of speed signal detection means to automatically cause the shifting means to shift said transmission to a first predetermined speed ratio when the first mode signal is provided and the speed signal terminates and to a second predetermined speed ratio when the second mode signal is provided and the speed signal terminates.

15. An automatic control for a transmission system including a torque converter driven by an engine, torque converter lockup means for locking up the torque converter to provide a direct drive therethrough, a mechanical transmission driven by the torque converter and upshiftable and downshiftable among a plurality of speed ratios to provide a variable speed transmission output, shifting means operatively associated with the mechanical transmission for selectively shifting said mechanical transmission among the plurality of speed ratios, speed sensor means responsive to the speed of the transmission output to provide a speed signal proportional thereto, and shift control means upshiftable and downshiftable to a desired transmission speed ratio and providing ratio signals representative thereof, comprising: mode select means selectable between first and second transmission system operating modes and respectively providing first and second mode signals representative thereof; and logic means operatively associated with the mode select means, the shift control means, and the speed sensor means to automatically cause within a first range of speed ratios established by the ratio signal, the shifting means to upshift and downshift said transmission at a first and second set of predetermined speed signals, respectively, and to automatically inhibit the torque converter lockup means from locking up the torque converter when the first mode signal is provided, and to automatically cause, within a second range of speed ratios established by the ratio signal, the shifting means to upshift and downshift said transmission at a third and fourth set of predetermined speed signals, respectively, and to automatically cause the torque converter lockup means to lockup the torque converter at a fifth and sixth set of predetermined speed signals with an upshift and downshift, respectively, of the shift control means when the second mode signal is provided.

* * * * *